H. BERG.
Gas Burner.
No. 47,787. Patented May 23, 1865.
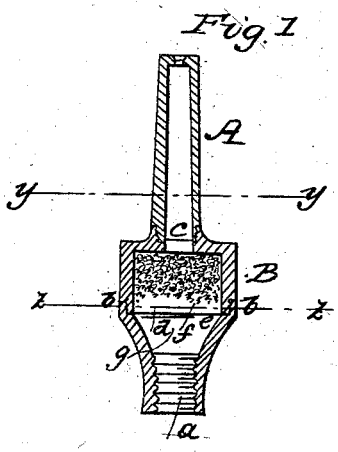
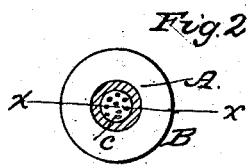
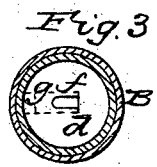
Witnesses
M. M. Livingston
C. L. Topliff
Inventor
Hermann Berg

UNITED STATES PATENT OFFICE.

HERMANN BERG, OF UNION HILL, NEW JERSEY.

IMPROVED GAS-BURNER.

Specification forming part of Letters Patent No. 47,787, dated May 23, 1865.

*To all whom it may concern:*

Be it known that I, HERMAN BERG, of Union Hill, in the county of Bergen and State of New Jersey, have invented a new and Improved Gas Burner; and I do hereby declare that the following is a full, clear, and exact description thereof, which will enable others skilled in the art to make and use the same, reference being had to the accompanying drawings, forming part of this specification, in which—

Figure 1 is a longitudinal vertical central section of this invention, the line $x\ x$, Fig. 2, indicating the plane of section. Fig. 2 is a horizontal section of the same, taken in the plane indicated by the line $y\ y$, Fig. 1. Fig. 3 is a similar section taken in the plane indicated by the line $z\ z$, Fig. 1.

Similar letters of reference indicate like parts.

The object of this invention is an improvement in that class of gas-burners in which the supply of gas to the tip regulates itself according to the pressure of the gas.

The invention consists in the application to the body of the burner of a chamber fitted with pulverized carbon, or other absorbent and purifying material, and closed on top by a perforated metal plate and on bottom by a horizontal partition provided with an aperture and with a spring-valve in such a manner that by the pressure of the gas itself the spring-valve is more or less closed and the supply of gas to the tip rendered self-regulating, and that the gas before it is allowed to reach to the tip has to pass through the purifying material, which retains all condensible impurities, and a steady even flame is obtained.

A represents the tip of my burner, which may be made of brass or any other suitable material. It screws into the body B, which is provided at its bottom end with an internal screw-thread, $a$, to fit to the gas-pipe in the usual manner. Said body is made in two parts, which are united by a screw-thread, $b$, as clearly shown in Fig. 1, and it is provided with two horizontal partitions, $c\ d$, placed at such distance apart that a chamber, $e$, is formed, which is filled with pulverized carbon or other absorbent material. The upper partition, $c$, is perforated with a large number of small holes, or it may be made of a piece of wire-gauze, so as to prevent the carbon or other absorbent material from passing up in the tip. The lower partition, $d$, is perforated with an aperture, $f$, and secured to its under surface is a thin metal plate, $g$, which forms a spring-valve capable of closing almost, but not quite, the aperture $f$. The elastic force of this spring-valve is so regulated that it closes when the pressure of the gas exceeds a certain limit, and the aperture $f$ in the partition $d$ is thus more or less closed, according to the greater or smaller pressure of the gas. When the spring-valve is forced close up to the under surface of the partition $d$, a very small opening only is left for the passage of the gas, but in this case the pressure of the gas is high and a sufficient quantity passes through to supply the flame. In reaching the chamber $e$ the gas has to pass through the absorbent material contained in the same, and all condensible impurities mixed with the gas are retained. By these means all waste of gas from overpressure is avoided and a clear and steady flame is obtained.

I claim as new and desire to secure by Letters Patent—

A gas-burner provided with a chamber, $e$, containing pulverized carbon or other absorbent material, and with a spring-valve, $g$, closing up on an aperture, $f$, by the pressure of the gas, substantially as and for the purpose set forth.

HERMANN BERG.

Witnesses:
   M. M. LIVINGSTON,
   C. L. TOPLIFF.